US010885687B2

(12) United States Patent
Severn et al.

(10) Patent No.: US 10,885,687 B2
(45) Date of Patent: Jan. 5, 2021

(54) AUGMENTED REALITY CONSUMPTION DATA ANALYSIS

(71) Applicant: AURASMA LIMITED, Bracknell (GB)

(72) Inventors: Robert Paul Severn, San Francisco, CA (US); David Stone, Alameda, CA (US); Matthew Sullivan, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 510 days.

(21) Appl. No.: 15/515,275

(22) PCT Filed: Sep. 29, 2014

(86) PCT No.: PCT/EP2014/070797
§ 371 (c)(1),
(2) Date: Mar. 29, 2017

(87) PCT Pub. No.: WO2016/050265
PCT Pub. Date: Apr. 7, 2016

(65) Prior Publication Data
US 2017/0236316 A1 Aug. 17, 2017

(51) Int. Cl.
*G06T 11/60* (2006.01)
*G06Q 30/02* (2012.01)
*G06Q 30/00* (2012.01)
*G06F 3/0484* (2013.01)

(52) U.S. Cl.
CPC ............. *G06T 11/60* (2013.01); *G06Q 30/02* (2013.01); *G06F 3/04842* (2013.01); *G06Q 30/01* (2013.01)

(58) Field of Classification Search
CPC ........ G06T 11/60; G06Q 30/02; G06Q 30/01; G06F 3/04842
See application file for complete search history.

(56) References Cited

U.S. PATENT DOCUMENTS 7,490,045 B1 * 2/2009 Flores .................... G06Q 10/10
702/62
7,812,815 B2   10/2010 Banerjee et al.
8,531,483 B1    9/2013 Schileru
(Continued)

FOREIGN PATENT DOCUMENTS

CN       103733177       4/2014
CN       103971249       8/2014

OTHER PUBLICATIONS

Graff, J., Tracking Visited Nodes in a Graph Visitor, Feb. 16, 2012. ~ 3 pages http://stackoverflow.com/questions/9315502/tracking-visited-nodes-in-a-graph-visitor.
(Continued)

*Primary Examiner* — William A Beutel
(74) *Attorney, Agent, or Firm* — HP Inc. Patent Department

(57) ABSTRACT

Examples of techniques to display graphical representations of analyzed augmented reality (AR) consumption data are disclosed. In one example implementation according to aspects of the present disclosure, consumption data generated from an AR experience is analyzed. A graphical representation of the analyzed consumption data is then displayed.

13 Claims, 5 Drawing Sheets

(56) References Cited

U.S. PATENT DOCUMENTS

| | | | |
|---|---|---|---|
| 2003/0118087 A1* | 6/2003 | Goldthwaite | G06F 17/30873 375/219 |
| 2004/0174397 A1 | 9/2004 | Cereghini et al. | |
| 2005/0125276 A1 | 6/2005 | Rusu | |
| 2010/0198879 A1* | 8/2010 | Flores | G06F 11/3419 707/802 |
| 2010/0241525 A1 | 9/2010 | Aguera y Arcas et al. | |
| 2010/0251128 A1 | 9/2010 | Cordasco | |
| 2013/0263023 A1 | 10/2013 | Goodwin | |
| 2014/0122220 A1 | 5/2014 | Bradley et al. | |
| 2014/0129328 A1 | 5/2014 | Mathew | |
| 2014/0282118 A1* | 9/2014 | Kumamoto | G06F 3/0481 715/760 |
| 2015/0007114 A1* | 1/2015 | Poulos | G06F 3/012 715/852 |

OTHER PUBLICATIONS

Halpin, Harry, et al. "Exploring semantic social networks using virtual reality", Springer Berlin Heidelberg, 2008, pp. 599-614, vol. 5318.

\* cited by examiner

AUGMENTED REALITY CONSUMPTION DATA ANALYSIS

BACKGROUND

Augmented reality platforms provide the ability to overlay digital media content (e.g., images, videos, three-dimensional models, etc.) onto a trigger image. The trigger image represents an image or other graphical representation that, when scanned by an augmented reality enabled device (e.g., a mobile phone, smart phone, tablet computing device, etc.) using image recognition, activates digital media content to be displayed on the augmented reality enabled device. A variety of digital media content may be displayed concurrently, in succession, or in similar combinations on the augmented reality enabled device.

BRIEF DESCRIPTION OF THE DRAWINGS

The following detailed description references the drawings, in which.

DETAILED DESCRIPTION

Figure 2:
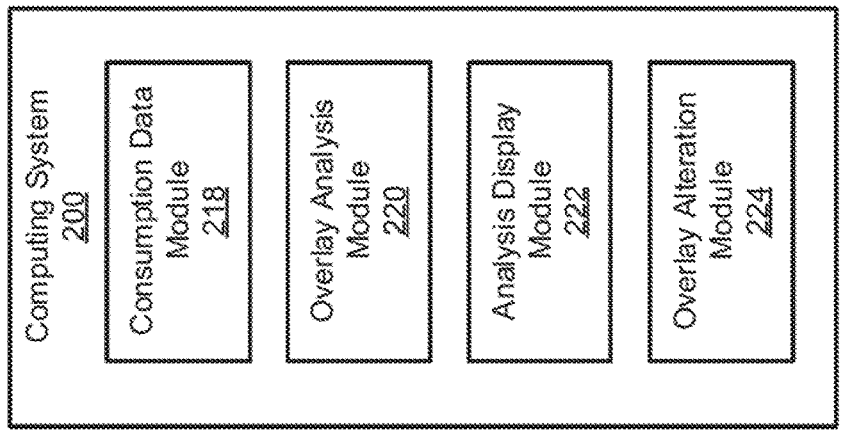
FIG. 2 illustrates a block diagram of another computing system to display a graphical representation of analyzed augmented reality consumption data according to examples of the present disclosure.

Augmented reality (AR) platforms may be used in sales, marketing, advertising, and other similar situations. For example, an automobile manufacture may utilize augmented reality platforms by enabling a customer or potential customer to scan a trigger image, such as the car manufacturers logo, to learn more about the manufacturer and/or a particular automobile. If a user scans the trigger image, the user may then be provided with an augmented reality experience of watching a video about the manufacturer's newest car. The augmented reality experience may also provide additional information, such as product specifications, and/or options to the user, such as a social media link or links to share the video.

Augmented reality experiences (also referred to as "auras") may be tailored for specific groups (known as "targeting groups"). For example, different AR experiences may be used depending on a variety of factors such as location, age, sex, preferences, etc. In one such example, a targeting group may target males 18-29 years of age, while another targeting group may target females 13-17. These targeting groups are useful to advertisers and marketers, for example, so that content overlay sets (i.e., digital content to be displayed on the user's device) can be delivered with the targeting group individuals in mind.

Designers of augmented reality platforms rely on testing the augmented reality experiences during the design process (for example, when initially designing the AR experience or when incorporating changes to the AR experience). However, quickly testing changes to an AR experience that a designer is actively testing is difficult when incorporating changes to the AR experience for different targeting groups. This is because each experience is launched by the same trigger image. Moreover, it may be difficult for a designer of an AR experience to understand how end users are interacting with the AR experience. More particularly, it is difficult for designers of AR experiences to visualize what is visible in the AR experience at any given moment in time, and what a user's experience is like as the user navigates through the AR experience. Consequently, it is difficult for a designer to adapt the AR experience without analytics describing the users' interactions with the AR experience.

Various implementations are described below by referring to several examples of techniques to display graphical representations of analyzed augmented reality (AR) consumption data are disclosed. In one example implementation according to aspects of the present disclosure, consumption data generated from an AR experience is analyzed. A graphical representation of the analyzed consumption data is then displayed.

In some implementations, the techniques described herein provide simple visualizations of user interactions with an AR experience. Consequently, an AR experience may be adapted, making the AR experience more valuable to marketers, advertisers, and others who may utilize the AR experience. The present techniques also provide a simple display of what is visible at any given time to an end user and further provide for easy navigation of the flow of the AR experience. The present techniques also provide graphical representations of analyzed data relating to consumed augmented reality overlays. These and other advantages will be apparent from the description that follows.

Figure 1:
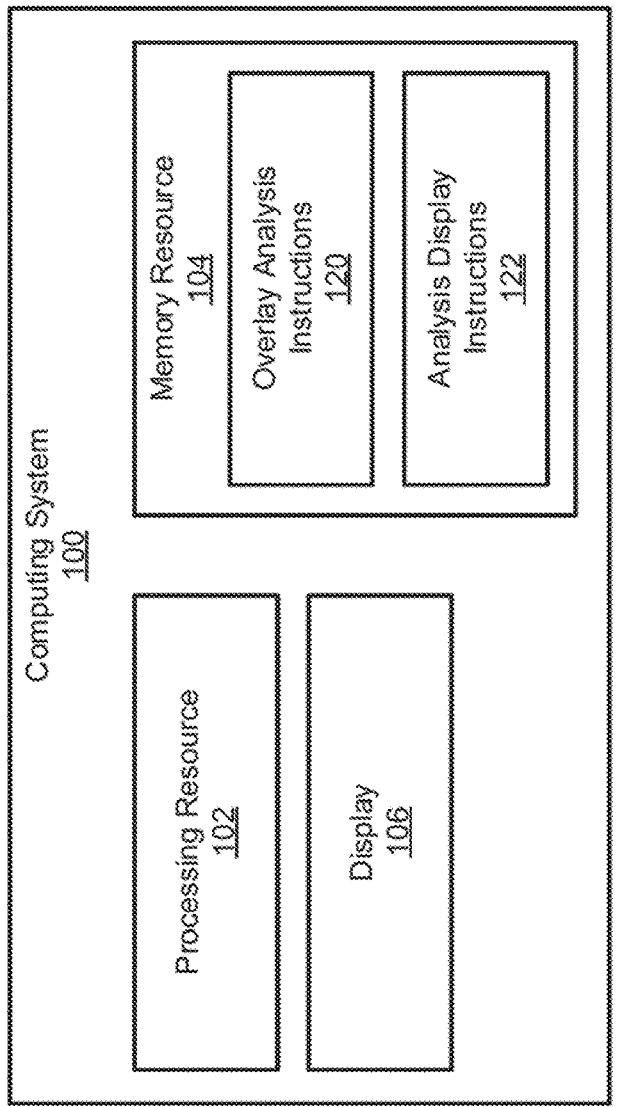
FIG. 1 illustrates a block diagram of a computing system to display a graphical representation of analyzed augmented reality consumption data according to examples of the present disclosure.
Figure 3:
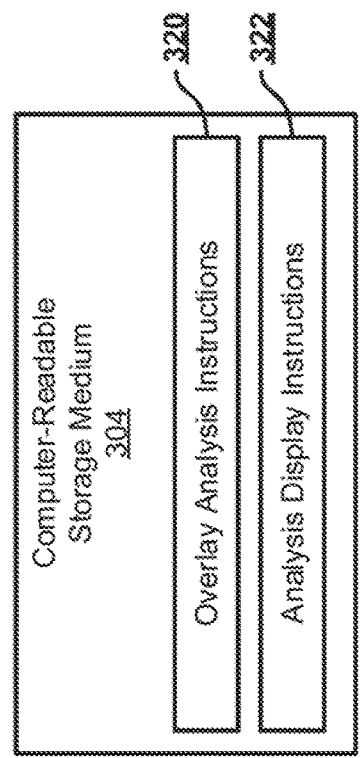
FIG. 3 illustrates a block diagram of a computer-readable storage medium storing instructions to display a graphical representation of analyzed augmented reality consumption data according to examples of the present disclosure.

FIGS. 1-3 include particular components, modules, instructions etc. according to various examples as described herein. In different implementations, more, fewer, and/or other components, modules, instructions, arrangements of components/modules/instructions, etc. may be used according to the teachings described herein. In addition, various components, modules, etc. described herein may be implemented as instructions stored on a computer-readable storage medium, hardware modules, special-purpose hardware (e.g., application specific hardware, application specific integrated circuits (ASICs), embedded controllers, hardwired circuitry, etc.), or some combination or combinations of these.

Generally, FIGS. 1-3 relate to components and modules of a computing system, such as computing system 100 of FIG. 1 and/or computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, or the like.

FIG. 1 illustrates a block diagram of a computing system 100 to display a graphical representation of analyzed augmented reality consumption data according to examples of the present disclosure. The computing system 100 may include a processing resource 102 that represents generally any suitable type or form of processing unit or units capable of processing data or interpreting and executing instructions. The processing resource 102 may be one or more central processing units (CPUs), microprocessors, and/or other hardware devices suitable for retrieval and execution of instructions. The instructions may be stored, for example, on a non-transitory tangible computer-readable storage medium, such as memory resource 104 (as well as computer-readable storage medium 304 of FIG. 3), which may include any electronic, magnetic, optical, or other physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions may be stored during runtime, and a secondary memory, such as a non-volatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

In addition, the computing system 100 may include a display 106. In examples, the display 106 may be or include a monitor, a touchscreen, a projection device, and/or a touch/sensory display device. The display 106 may display text, images, and other appropriate graphical content such augmented reality experiences, augmented reality overlays, graphical representations of analyzed augmented reality consumption data, and the like.

In this example, it should be appreciated that the computing system 100 displays a graphical representation of analyzed augmented reality consumption data to a content creation user (such as on display 106) to enable the content creation user to create and adapt an augmented reality (AR) experience. The AR experience is consumed (i.e., viewed and interacted with) by users of user computing devices (i.e., computing systems and/or computing devices other than computing system 100).

To facilitate the display of the graphical representation of analyzed consumption data in an AR experience, the computing system 100 may include overlay analysis instructions 120 and analysis display instructions 122. The instructions 120, 122 may be processor executable instructions stored on a tangible memory resource such as memory resource 104, and the hardware may include processing resource 102 for executing those instructions. Thus memory resource 104 can be said to store program instructions that when executed by the processing resource 102 implement the modules described herein. Other instructions may also be utilized as will be discussed further below in other examples.

The overlay analysis instructions 120 analyze data generated from an augmented reality (AR) experience by determining which of a plurality of AR overlays were consumed by a user of the AR experience. For example, an AR experience (including AR overlays) is presented to a user on a user computing device. As the user interacts with and consumes the content and features of the AR experience and associated AR overlays, consumption data is generated on the user computing device and is sent to the computing system 100. Once received, the consumption data is analyzed.

In one example, analyzing the consumption data includes determining which of the AR overlays were consumed by the user on the user computing device. For instance, the consumption data may indicate that the user viewed an introduction content overlay set, selected a video to watch, watched the video, and then shared the video on a social media platform. In another example, analyzing the consumption data includes determining which AR events (i.e., user actions and or system events) associated with the overlays were consumed by the user, for example, which "share" links were selected to share content on a social media platform.

In yet another example, analyzing the consumption data may include determining a frequency of consumption of AR overlays from the consumption data. For example, when many users experience the same AR experience, the overlay analysis instructions 120 determine the frequency of which each AR overlays is consumed (i.e., viewed and/or otherwise interacted with) by the user. By determining consumption frequency, a content creator may be able to better understand how users of the AR experience are consuming content and overlays within the AR experience. Consequently, the content creator can adapt an overlay, the flow between overlays, or the overall AR experience to increase user traffic to certain overlays or content.

Once the overlay analysis instructions 120 analyze the consumption data, the analysis display instructions 122 display a graphical representation of the analyzed data. For example, the graphical representation may include the frequency of consumption of the plurality of AR overlays. Similarly, the graphical representation may include other quantitative measures of the degree to which the AR overlays and any associated AR events were consumed by the user of the AR experience.

Figure 6:
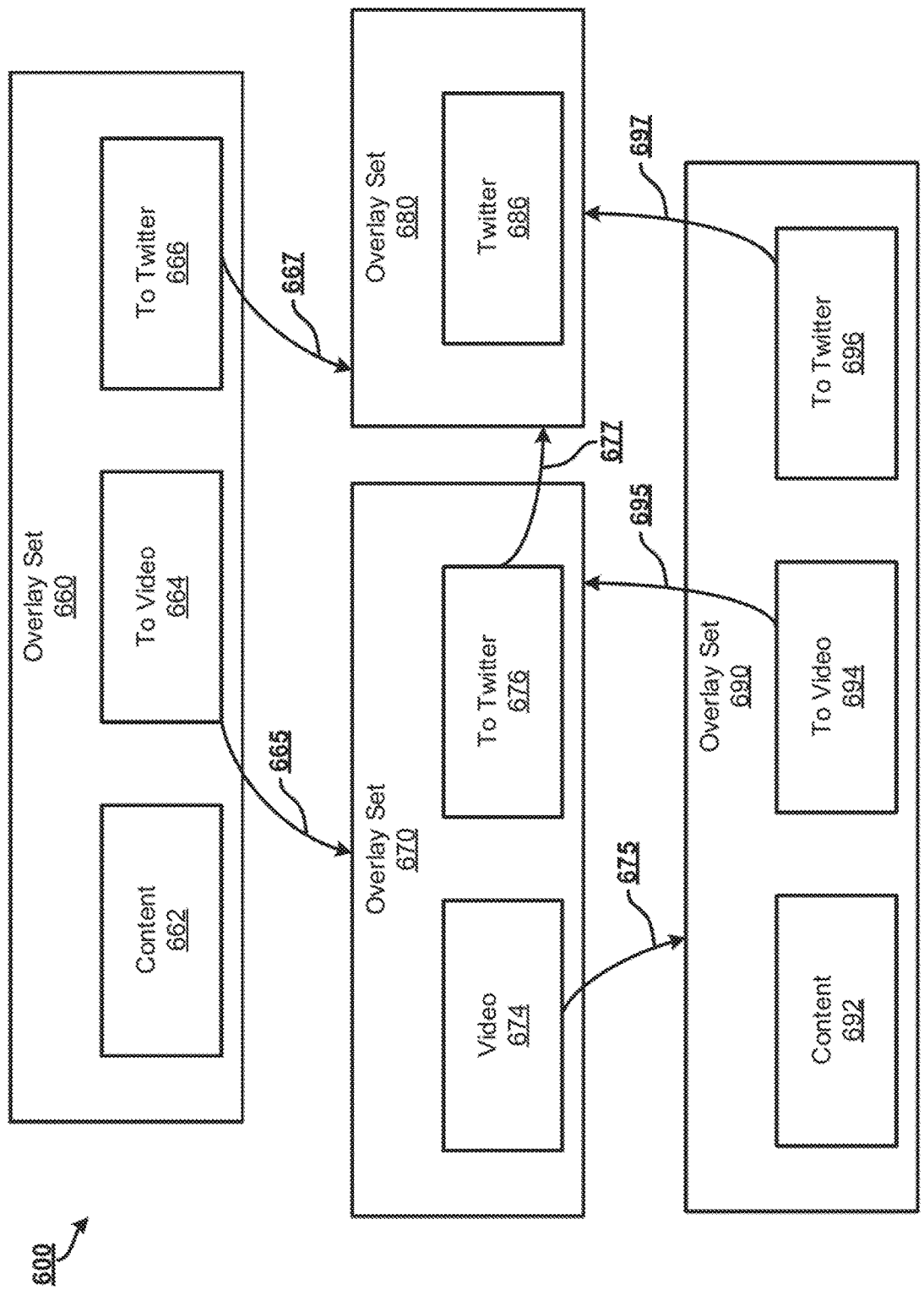
FIG. 6 illustrates a graphical representation of overlay sets and associated events as may be displayed using the techniques described according to examples of the present disclosure.
Figure 7:
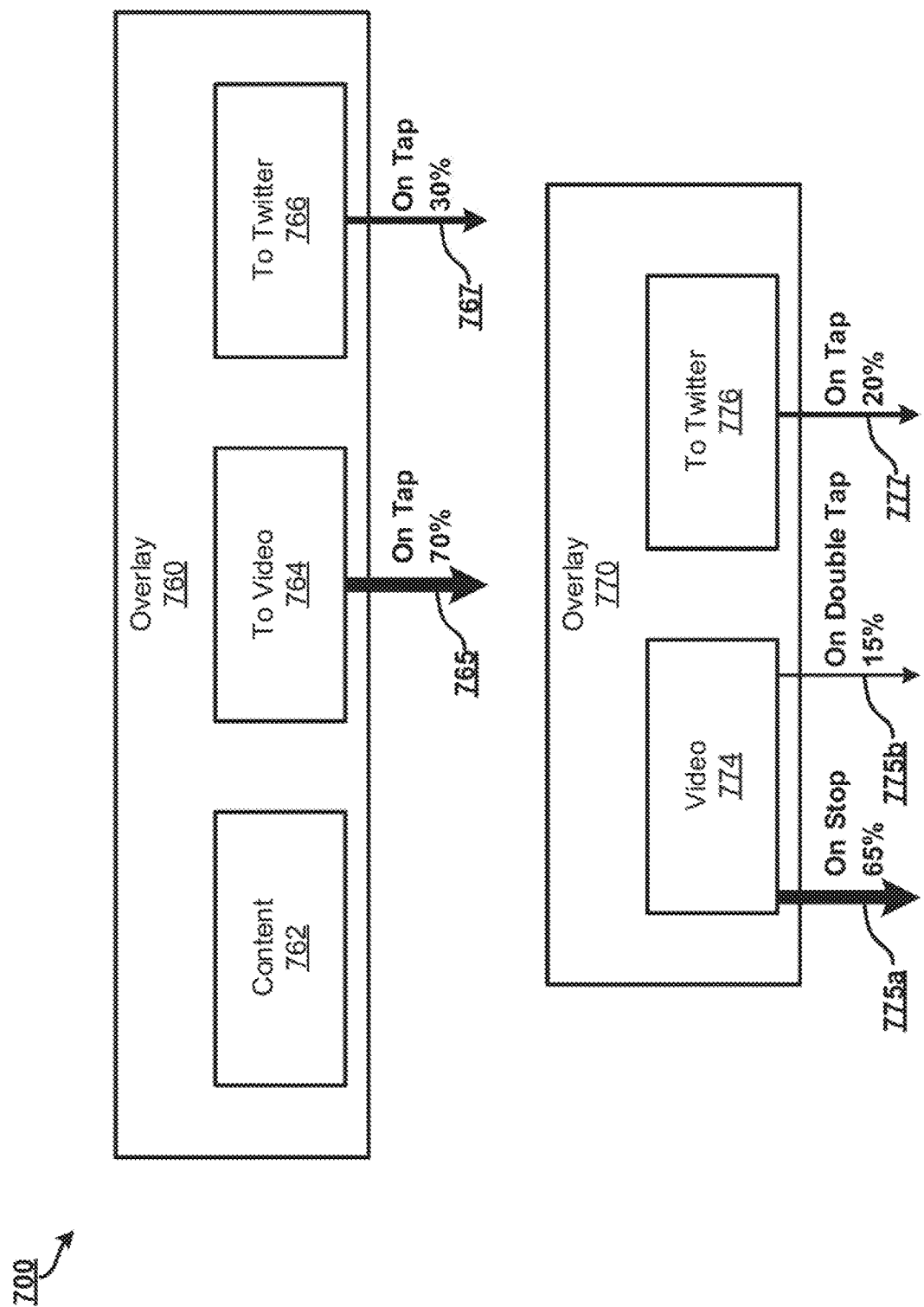
FIG. 7 illustrates a graphical representation of overlay set analytics as applied to the overlay sets of FIG. 6 using the techniques described according to examples of the present disclosure.

In examples, a content creator may desire to view a graphical representation of the analyzed data to understand how users of the AR experience interact with the overlays so that the content creator can adapt the overlays. Graph traversal techniques may be applied to display (such as on display 106) the overlays and associated events as a graphical representation. Graph traversal techniques utilize "nodes" and "edges" to display visual representations, such as the flow of overlays. A node is an individual point on a graph, and an edge connects the nodes. In the case of an augmented reality experience of the present disclosure, a node represents a group of visible overlays, while an edge represents the event connecting two visible overlay groups (i.e., nodes). For example, an edge may represent an event (i.e., a user action or system event) that causes an overlay to change visibility. A user selecting an image overlay that shows another overlay or a video coming to an end that hides the video and shows a webpage are two such examples of edges. An example of a graphical representation of the graph traversal techniques is illustrated in FIG. 6, as discussed below. In FIG. 7, a similar graphical representation is shown inclusive of the results of the analysis of the consumption data.

Additional instructions may also be included in memory resource 104 of computing system 100 of FIG. 1. For example, the memory resource 104 may include instructions to alter one of the AR overlays based in part on the graphical representation of the analyzed data. In this way, a content creator can alter the AR experience based on the analyzed consumption data.

FIG. 2 illustrates a block diagram of another computing system 200 to display a graphical representation of analyzed augmented reality consumption data according to examples of the present disclosure. The computing system 200 may include a consumption data module 218, an overlay analysis module 220, an analysis display module 222, and an overlay alteration module 224.

In examples, the modules described herein may be a combination of hardware and programming instructions. The programming instructions may be processor executable instructions stored on a tangible memory resource such as a memory resource, and the hardware may include a processing resource for executing those instructions. Thus the memory resource can be said to store program instructions that when executed by the processing resource implement the modules described herein. Other modules may also be utilized as will be discussed further below in other examples. In different implementations, more, fewer, and/or other components, modules, instructions, and arrangements thereof may be used according to the teachings described herein. In addition, various components, modules, etc. described herein may be implemented as computer-executable instructions, hardware modules, special-purpose hardware (e.g., application specific hardware, application specific integrated circuits (ASICs), and the like, or some combination or combinations of these.

The consumption data module 218 receives augmented reality consumption data from user devices. In examples, an AR experience (including AR overlays) is presented to a user on a user computing device. As the user interacts with and consumes the content and features of the AR experience and associated AR overlays, consumption data is generated on the user computing device and is sent to the computing system 100. The consumption data module 218 may receive consumption data generated from numerous user devices. In examples, consumption data is generated multiple times from the same device if the user views the AR experience multiple times. In this case, the consumption data may vary based on each of the users different AR experiences. Once received, the consumption data is analyzed by the overlay analysis module 220.

In particular, the overlay analysis module 220 analyzes data generated from an augmented reality (AR) experience by determining which of a plurality of AR overlays were consumed by a user of the AR experience. For example, an AR experience (including AR overlays) is presented to a user on a user computing device. As the user interacts with and consumes the content and features of the AR experience and associated AR overlays, consumption data is generated on the user computing device and is sent to the computing system 100. Once received, the consumption data is analyzed, such as to determine which AR overlays were consumed and with what frequency those AR overlays were consumed.

The analysis display module 222 displays a graphical representation of the analyzed data. For example, the graphical representation may include the frequency of consumption of the plurality of AR overlays. Similarly the graphical representation may include other quantitative measures of the degree to which the AR overlays and any associated AR events were consumed by the user of the AR experience.

The overlay alteration module 224 enables the content creator to alter the content of the overlays and the events associated with them. For example, a content creator may desire to add an event to an overlay after creating the overlay, or the content creator may desire to change the content on an overlay. Such alterations may be performed using the overlay alteration module 224. It should be understood that the content of an overlay and any events associated with an overlay may be altered by the overlay alteration module 224.

FIG. 3 illustrates a block diagram of a computer-readable storage medium 304 storing instructions to display a graphical representation of analyzed augmented reality consumption data according to examples of the present disclosure. The computer-readable storage medium 304 is non-transitory in the sense that it does not encompass a transitory signal but instead is made up of one or more memory components configured to store the instructions. The computer-readable storage medium may be representative of the memory resource 104 of FIG. 1 and may store machine executable instructions in the form of modules, which are executable on a computing system such as computing system 100 of FIG. 1 and/or computing system 200 of FIG. 2.

In the example shown in FIG. 3, the instructions 320, 322 may include overlay analysis instructions 320 and analysis display instructions 322. In other examples, additional instructions may be included in the computer-readable storage medium 304, such as overlay generation instructions and overlay alteration instructions. The instructions 320, 322 of the computer-readable storage medium 304 may be executable so as to perform the techniques described herein, including the functionality described regarding the method 400 of FIG. 4. While the functionality of these instructions 320, 322 is described below with reference to the functional blocks of FIG. 4, such description is not intended to be so limiting.

Figure 4:
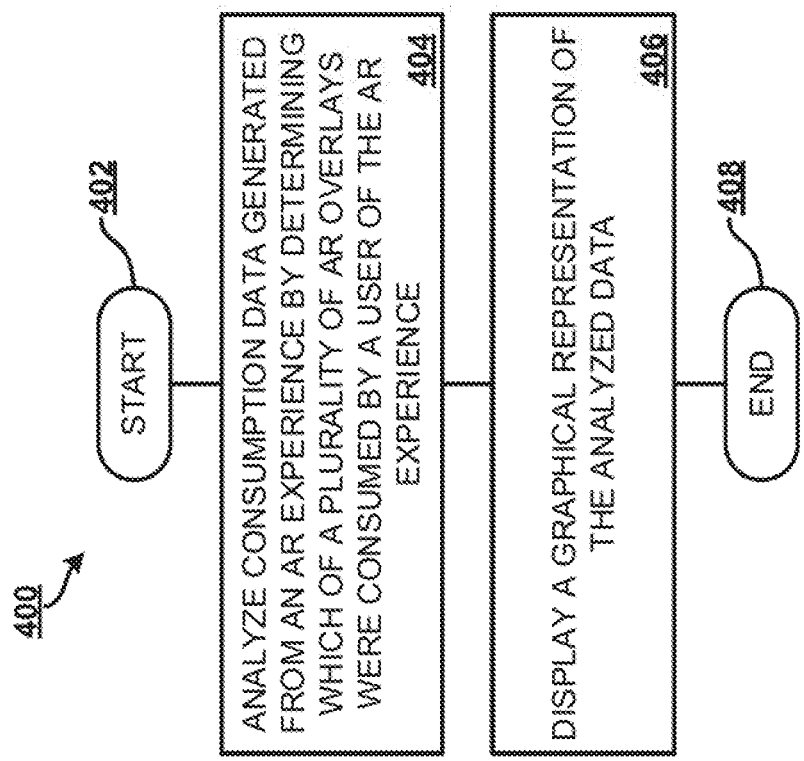
FIG. 4 illustrates a flow diagram of a method to display a graphical representation of analyzed augmented reality consumption data according to examples of the present disclosure.

In particular, FIG. 4 illustrates a flow diagram of a method 400 to display a graphical representation of analyzed augmented reality consumption data according to examples of the present disclosure. The method 400 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1), cause the processor to perform the method 400. It should be appreciated that the method 400 may be executed by a computing system or a computing device such as computing system 100 of FIG. 1 and/or computing system 200 of FIG. 2.

At block 402, the method 400 begins and continues to block 404. At block 404, the method 400 includes a computing system (e.g., computing system 100 of FIG. 1 and/or computing system 200 of FIG. 2) analyzing consumption data generated from an augmented reality experience by determining which of a plurality of AR overlays were consumed by a user of the AR experience. Analyzing the consumption data may include determining a frequency of AR overlay consumption. The consumption data is received, for example, from user computing devices that display the AR experience. Analyzing the consumption data may be performed, for example, by the overlay analysis instructions 120 and/or 320 of FIGS. 1 and 3 respectively and/or by the overlay analysis module 220 of FIG. 2. The method 400 continues to block 406.

At block 406, the method 400 includes the computing system (e.g., computing system 100 of FIG. 1 and/or computing system 200 of FIG. 2) displaying a graphical representation of the analyzed data. The graphical representation may include quantitative measures of the degree to which the AR overlays and any associated AR events were consumed by the user of the AR experience. Displaying the graphical representation of the consumption data may be performed, for example, by the analysis display instructions 122 and/or 322 of FIGS. 1 and 3 respectively and or by the analysis display module 222 of FIG. 2. The method 400 continues to block 408 and terminates.

Additional processes also may be included. For example, the method 400 may include the computing system (e.g., computing system 100 of FIG. 1 and/or computing system 200 of FIG. 2) altering at least one of the plurality of augmented reality overlays based on the graphical representation of the analyzed consumption data. It should be understood that the processes depicted in FIG. 4 represent illustrations, and that other processes may be added or existing processes may be removed, modified, or rearranged without departing from the scope and spirit of the present disclosure.

Figure 5:
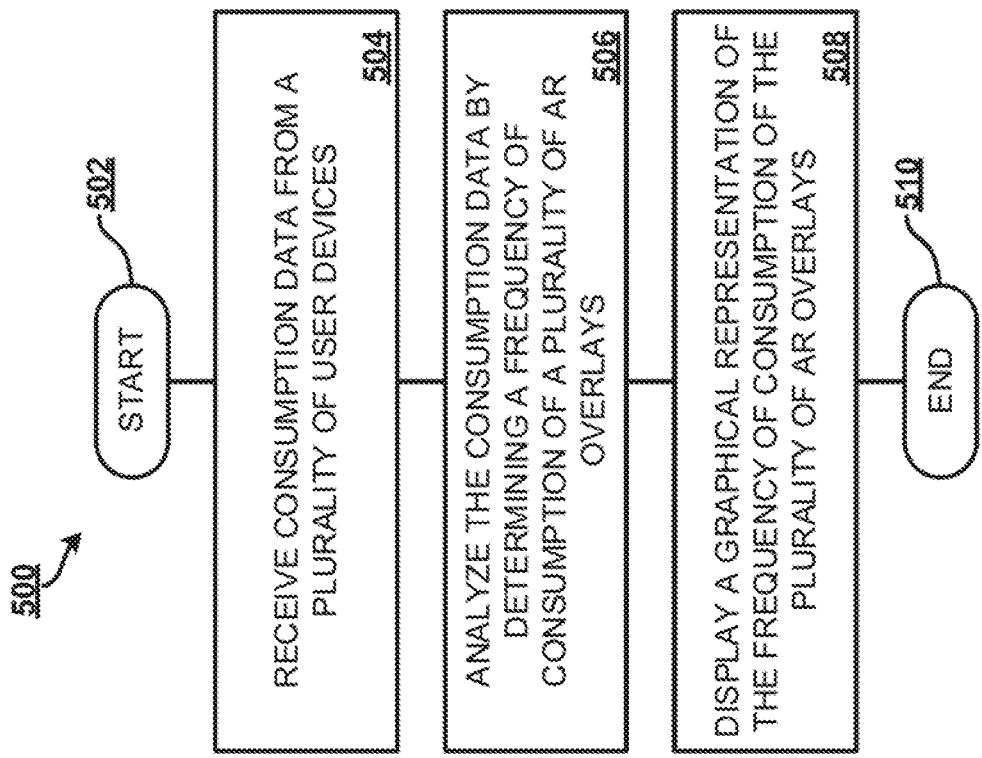
FIG. 5 illustrates a flow diagram of a method to display a graphical representation of analyzed augmented reality consumption data according to examples of the present disclosure.

FIG. 5 illustrates a flow diagram of a method 500 to display a graphical representation of analyzed augmented reality consumption data according to examples of the present disclosure. The method 500 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1), cause the processor to perform the method 500. It should be appreciated that the method 500 may be executed by a computing system or a computing device such as computing system 100 of FIG. and/or computing system 200 of FIG. 2.

At block 502, the method 500 begins and continues to block 504. At block 504, the method 500 includes a computing system (e.g., computing system 100 of FIG. 1 and/or computing system 200 of FIG. 2) receiving consumption data from a plurality of user devices based on an AR experience. The consumption data may include information concerning the user's AR experience. For example, the consumption data may include a user edge selection and an associated node viewed when the user edge selection occurred. The associated node is an AR overlay set visible at a given time and the user edge selection is a user action or system event that causes the AR overlay set to change visibility. Causing the AR overlay set to change visibility includes the user navigating to another AR overlay set. Receiving the consumption data may be performed, for example, by the consumption data module 218 of FIG. 2. The method 500 continues to block 506.

At block 506, the method 500 includes the computing system (e.g., computing system 100 of FIG. 1 and/or computing system 200 of FIG. 2) analyzing the consumption data by determining a frequency of consumption of a plurality of AR overlays. The analysis may be performed, for example, by the overlay analysis instructions 120 and/or 320 of FIGS. 1 and 3 respectively and/or by the overlay analysis module 220 of FIG. 2. The method 500 continues to block 508.

Figure 8:
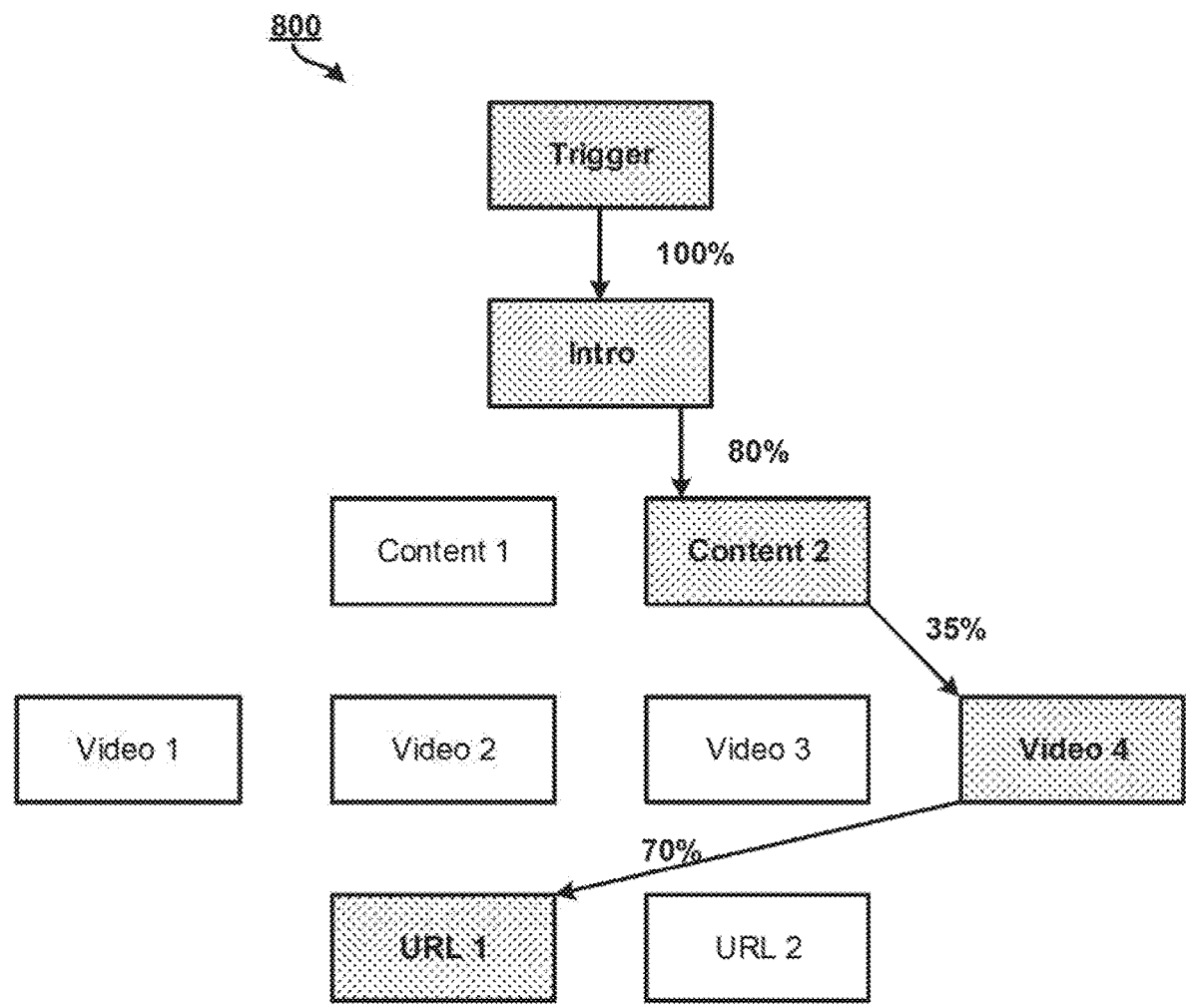
FIG. 8 illustrates a block diagram of a user journey through an augmented reality experience along with analyzed data of the augmented reality experience according to examples of the present disclosure.

At block 508, the method 500 include a computing system (e.g., computing system 100 of FIG. 1 and/or computing system 200 of FIG. 2) displaying a graphical representation of the frequency of consumption of the plurality of AR overlays. The graphical representation may also include graphical representations of the user edge selection and the associated node viewed when the user edge selection occurred. The frequency of consumption may also be displayed as a user journey through the AR experience, an example of which is illustrated in FIG. 8. Displaying the overlays and associated events as a graphical representation may be performed, for example, by the analysis display instructions 122 and/or 322 of FIGS. 1 and 3 respectively and/or by the analysis display module 222 of FIG. 2. The method 500 continues to block 510 and terminates.

Additional processes also may be included, and it should be understood that the processes depicted in FIG. 5 represent illustrations, and that other processes may be added or existing processes may be removed, modified, or rearranged without departing from the scope and spirit of the present disclosure.

FIG. 6 illustrates a graphical representation 600 of overlay sets and associated events as may be displayed using the techniques described according to examples of the present disclosure. In the example of FIG. 6, the visible overlay sets represent nodes while the associated events represent edges as relating to the application of graph traversal techniques.

Overlay set 660 represents a first node having content 662 and links to video 664 and to Twitter® 660, which each represent events 665 and 667 respectively. That is, the events 665 and 667 show the flow from overlay set 660 to overlay sets 670 and 680 respectively. If the video link 664 is selected in overlay set 660, for example, then the flow continues to overlay set 670 via the edge 665. Similarly, if the Twitter® link 666 is selected in overlay set 660, the flow continues to overlay set 680 via edge 667.

Overlay set 670 represents a second node having a video link 674 and a Twitter® link 676. If the Twitter® link 676 is selected in overlay set 670, the flow continues to overlay set 680 via edge 677. If the video 674 is selected (i.e., viewed), the flow continues to overlay set 690 (such as when the video ends or when the user stops the video), which represents a fourth node, via flow 675. Overlay set 690 may display content 692 and video link 694 and a Twitter® link 696. The video link 694 may flow back to overlay set 670 via edge 695 if selected, for example. Similarly, if the Twitter® link 696 is selected, the flow may continue to overlay set 680 via edge 697. It should be understood that the graphical representation 600 of FIG. 6 illustrates only one of many possible combinations of nodes and edges and thus should not be construed as limiting but rather as illustrative.

FIG. 7 illustrates a graphical representation 700 of overlay analytics as applied to the overlay sets of FIG. 6 using the techniques described according to examples of the present disclosure. In particular, FIG. 7 illustrates two overlay sets, overlay set 760 and overlay set 770. Overlay set 760 incudes content 762, a video link 764 and a Twitter® link 766. The video link 764 and the Twitter® link are illustrated with arrows 765 and 767 respectively, which represent the percentage of users who selected each of the two links. In the present example, the arrow 765 represents that 70% of users selected the video link 764, such as by tapping the video link 764. Similarly, the arrow 767 represents that 30% of users selected the Twitter® link 766 by tapping the Twitter® 766 link.

Overlay 770 includes a video 774 and a Twitter® link 776. The video 774 is illustrated with arrows 775a and 775b, which represent the percentage of users who continued to the next overlay set on video stop (65% of users as illustrated by arrow 775a) or who enlarged the video to full screen using a double tap (15% of users as illustrated by arrow 775b). The arrow 777 illustrates that 20% of users selected the Twitter® link 776.

It should be appreciated that the appearance of the arrows (in this example, the thickness of the arrows) may vary depending on the degree to which the representative action is performed. For instance, as the percentage of selection increases, the thickness of the arrow may also increase. This may aid a content creator in evaluating quickly the graphical representation 700 when looking for strengths, weaknesses, and/or overall flow of the AR experience for example. It should be appreciate that other variations are possible to distinguish visually the arrows, such as color, length, or type. In other examples, no distinguishing aspects may be incorporated.

FIG. 8 illustrates a block diagram of a user journey 800 through an augmented reality experience along with analyzed data of the augmented reality experience according to examples of the present disclosure. The user journey is one example of how a graphical representation of the frequency of consumption of the AR overlay sets may occur.

In this example, overlay sets are displayed as "trigger," "intro," "content 1," "content 2," "video 1," "video 2," "video 3," "video 4," "URL 1," and "URL 2." In the present example, the hierarchy shows that users initiate the AR experience through the trigger overlay set (such as by scanning a trigger image) and then continue to the intro overlay set. From the intro overlay set, the user has the option of selecting the content 1 overlay set or the content 2 overlay set. In this example, 80% of users have chosen the content 2 overlay set. Next, users are presented with the option to select four videos (video 1, video 2, video 3, and video 4). As illustrated, 35% of users have chosen video 4). Finally, after viewing the video, the user is presented with two URL links (URL 1 and URL 2). The user journey 800 shows that 70% of users select the URL 1.

The highlighted overlay sets are indicative that they are the most often chosen within their group (i.e., video 4 is the most often chosen video, URL 1 is the more often chosen link). In other examples of user journeys, additional details may be shown, such as the frequency of selection of each option, not merely the most common path as shown in user journey 800.

It should be emphasized that the above-described examples are merely possible examples of implementations and set forth for a clear understanding of the present disclosure. Many variations and modifications may be made to the above-described examples without departing from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A non-transitory computer-readable storage medium storing instructions that, when executed by a processor, cause the processor to:
   analyze consumption data generated from an augmented reality (AR) experience by determining which of a plurality of AR overlay sets were consumed by a plurality of users of the AR experience via a plurality of user devices that displayed the AR experience, and by determining frequencies with which users navigated to the AR overlay sets from other of the AR overlay sets;
   display on a display device a graphical representation of the analyzed consumption data, including graphically displaying visual indications of the determined frequencies; and
   alter the AR overlay sets based on the displayed graphical representation, the users subsequently consuming the altered AR overlay sets via the user devices displaying the AR experience.

2. The non-transitory computer-readable storage medium of claim 1, wherein the graphical representation includes quantitative measures of the degree to which the plurality of AR overlay sets and an associated plurality of AR events were consumed by the user of the AR experience.

3. The non-transitory computer-readable storage medium of claim 1, wherein analyzing the consumption data generated from the AR experience includes determining a frequency of AR overlay consumption.

4. The non-transitory computer-readable storage medium of claim 1, wherein the processor is further to receive the consumption data from the user devices.

5. A computing system comprising:
   a display device;
   a processor: and
   a non-transitory computer-readable medium storing computer-executable code that the processor executes to:
     analyze consumption data generated from an augmented reality (AR) experience by determining which of a plurality of AR overlay sets and which of a plurality of AR events associated with the plurality of overlay sets were consumed by a plurality of users of the AR experience via a plurality of user devices that displayed the AR experience, and by determining frequencies with which users navigated to the AR overlay sets from other of the AR overlay sets;
     display on the display device a graphical representation of the analyzed consumption data on a display, including graphically displaying visual indications of the determined frequencies; and
     alter the AR overlay sets based on the displayed graphical representation, the users subsequently consuming the altered AR overlay sets via the user devices displaying the AR experience.

6. The system of claim 5, wherein the processor further executes the computer-executable code to:
   receive the consumption data from the user devices.

7. The system of claim 6, wherein the graphical representation includes illustrating a user journey through the AR experience along with the analyzed consumption data.

8. The system of claim 6, wherein the graphical representation includes a plurality of nodes connected by edges, wherein the nodes comprises AR overlay sets visible at a given time, and wherein the edges comprises user actions or system events that causes the AR overlay to change visibility.

9. A method comprising:

receiving, by a computing system, consumption data from a plurality of user devices that displayed an augmented reality (AR) experience to a plurality of users;

analyzing, by the computing system, the consumption data by determining frequencies with which the users navigated to the AR overlay sets from other of the AR overlay sets;

displaying on a display device, by the computing system, a graphical representation of the analyzed consumption data, including graphically displaying visual indications of the determined frequencies; and altering, by the computing system, the AR overlay sets based on the displayed graphical representation, the users subsequently consuming the altered AR overlay sets via the user devices displaying the AR experience.

10. The method of claim 9,
wherein the consumption data includes a user edge selection and an associated node viewed when the user edge selection occurred,
wherein the associated node comprises an AR overlay set visible at a given time, and
wherein the user edge selection comprises a user action or system event that causes the AR overlay set to change visibility.

11. The method of claim 10, wherein causing the AR overlay set to change visibility includes navigating to another AR overlay set.

12. The method of claim 10, wherein the graphical representation of the frequencies includes graphical representations of the user edge selection and the associated node viewed when the user edge selection occurred.

13. The method of claim 9, wherein the graphical representation is displayed as a user journey through the AR experience.

* * * * *